June 16, 1942.    L. YOST    2,286,528
RADIAL BALL BEARING
Filed May 1, 1941
FIG. 1.
FIG. 2.
FIG. 3.
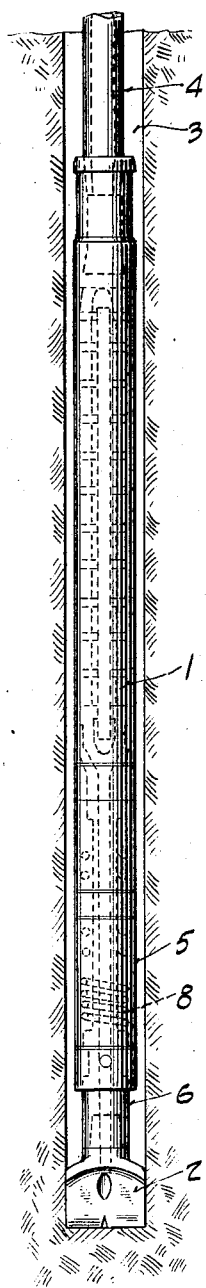
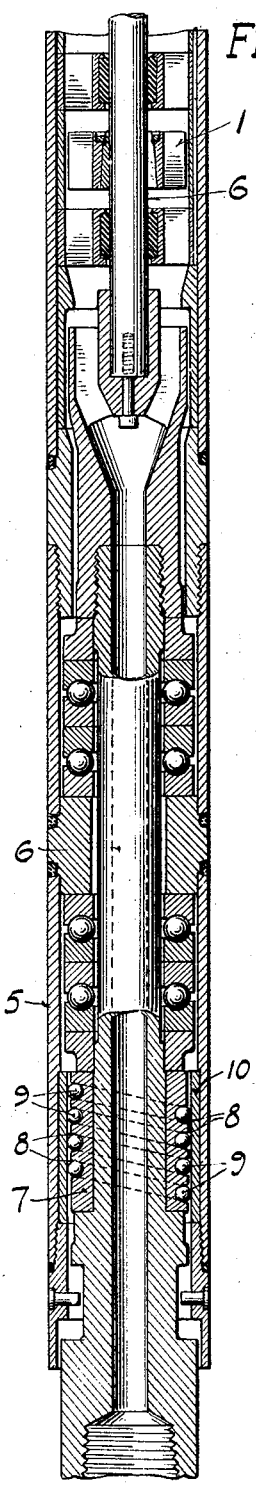
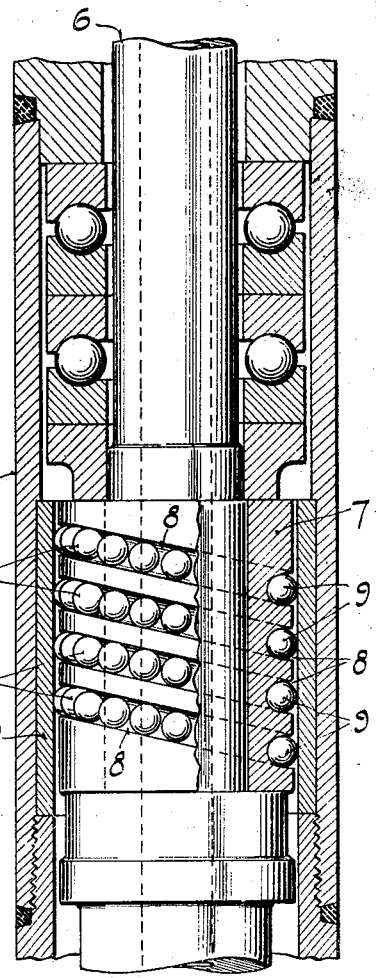
Lloyd Yost
INVENTOR.
BY
ATTORNEY.

Patented June 16, 1942

2,286,528

UNITED STATES PATENT OFFICE 2,286,528

RADIAL BALL BEARING

Lloyd Yost, Los Angeles, Calif., assignor to A. O. Smith Corporation, Milwaukee, Wis., a corporation of New York Application May 1, 1941, Serial No. 391,339

6 Claims. (Cl. 308—185)

This invention relates to a radial ball bearing and more particularly to one for use in a mud turbine for driving a well drill at the bottom of a well. In such turbines the bearings not only have to withstand the normal working pressures, but they operate in mud and the wear is a very great factor. Furthermore, the commercial value of a drill of this nature is dependent upon the length of time it can be kept in continuous service without withdrawing it from the well to repair its bearings or other parts.

The object of the present invention is to provide a ball bearing of the radial type which will be suitable for use under the conditions mentioned and which will have a longer life than heretofore obtained.

Another object is to provide a radial ball bearing which is entirely free from end thrust forces and which has a bearing surface of large area.

Another object is to prevent any tendency of the balls to cut a groove in the bearing surface.

These and other objects are accomplished by employing the present invention, one embodiment of which is illustrated in the accompanying drawing.

In the drawing:

Figure 1 is a side elevation of a turbine and drill operating in a well;

Fig. 2 is a vertical section through the lower end of the turbine showing the bearing structure; and Fig. 3 is an enlarged broken section of the radial bearing.

The bearing is shown employed in a turbine 1 which drives a drill 2 at the bottom of a well 3 and which is suspended by drill casing 4 from the top of the well.

The turbine 1 has an outer cylindrical housing 5 and a vertical rotor shaft 6 disposed axially thereof and to which the drill 2 is attached.

The radial bearing for the rotor shaft at the lower end of the housing 5 comprises an inner ball race 7 encircling the shaft 6 and secured to rotate therewith. The race has at least one and preferably about four circumferential grooves 8 in its outer surface for receiving and holding the same number of sets of balls 9. The grooves are separate from each other and they lie in parallel planes oblique to the axis of the shaft. The grooves have substantial depth, preferably about equal to three quarters of the diameter of the balls 9.

The balls 9 lie in the grooves 8 and bear outwardly against a bearing sleeve 10 secured in the housing 5. The bearing sleeve may be made from a medium hard manganese steel since this has been found to work well in a mud turbine where the spaces around the balls are filled with mud under pressure. The sleeve 10 has its inner surface smooth and hard to take the wear of the balls, and the length of the sleeve is determined by the total longitudinal extent of the grooves 8 in race 7.

In operation, as the shaft 6 rotates the balls 9 roll up and down longitudinally and around on the inner surface of sleeve 10. They follow no fixed path and therefore do not tend to wear grooves in the surface of the sleeve. In their travels they cover a large area of the sleeve and distribute the wear accordingly.

The angle of the planes of the grooves 8 determines whether the different sets of balls will engage overlapping areas on the sleeve. As the angle approaches a perpendicular to the axis of the shaft 6 the longitudinal movement of the balls becomes less until at perpendicular there is no longitudinal movement, under which conditions it is advisable to employ more sets of balls in order to prevent too much wear on the sleeve 10. Where the angle of the planes is increased the longitudinal travel of the balls is increased and may preferably overlap.

The number of sets of balls to be employed will depend upon the load for each and wear conditions having in mind the fact that the mud employed in operating the turbine is highly abrasive and that it has a relatively nigh viscosity.

Various embodiments of the invention may be employed within the scope of the claims.

The invention is claimed as follows:

1. In a bearing of the class described between radially spaced concentric members disposed for relative rotation, a ball race secured to the surface of one of said members facing said other member and having a ball retaining groove in its surface facing the other member, the plane of said groove lying oblique to the axis of the rotating member, and a set of rotating bearing elements disposed in the groove and engaging a cylindrical surface on said other member.

2. In a bearing of the class described between radially spaced concentric members disposed for relative rotation, a ball race secured to the surface on one of said members facing said other member and having a plurality of separate ball retaining grooves in its surface facing the other member, the planes of said grooves lying oblique to the axis of the rotating member, and separate sets of rotating bearing elements disposed in said grooves and engaging a cylindrical surface on said other member.

3. In a bearing of the class described between radially spaced concentric members disposed for relative rotation, a ball race secured to the surface of one of said members facing said other member and having a plurality of separate ball retaining grooves in its surface facing the other member, the planes of said grooves being parallel and lying oblique to the axis of the rotating member, and separate sets of balls disposed in said grooves and engaging said other member over a substantially large area of surface during the relative rotation of said members.

4. In a bearing of the class described between radially spaced concentric members disposed for relative rotation, a ball race mounted on one member and facing the other member, said race having a groove around the same in its surface facing said other member for receiving a set of bearing balls, said groove lying in a plane oblique to the axis of the rotating member, and a set of bearing balls in said groove and engaging said other member over a substantially large area of surface during the relative rotation of said members.

5. In a bearing of the class described between radially spaced concentric members disposed for relative rotation, a ball race secured to the surface of one of said members facing said other member and having a plurality of separate ball retaining grooves in its surface facing the other member, the planes of said grooves being parallel and lying oblique to the axis of the rotating member, and separate sets of balls disposed in said grooves and engaging said other member respectively over separate areas of surface during the relative rotation of said members.

6. In a bearing of the class described between radially spaced concentric members disposed for relative rotation, a ball race secured to the surface of one of said members facing said other member and having a plurality of separate ball retaining grooves in its surface facing the other member, the planes of said grooves being parallel and lying oblique to the axis of the rotating member, and separate sets of balls disposed in said grooves and engaging said other member respectively over overlapping areas of surface during the relative rotation of said members.

LLOYD YOST.